United States Patent
Chen et al.

(10) Patent No.: US 11,727,671 B1
(45) Date of Patent: Aug. 15, 2023

(54) EFFICIENT AND OPTIMAL FEATURE EXTRACTION FROM OBSERVATIONS

(71) Applicant: Motional AD LLC, Boston, MA (US)

(72) Inventors: Zhiliang Chen, Singapore (SG); Ke Yi Kaitlyn Ng, Singapore (SG); Pietro Zullo, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/897,107

(22) Filed: Aug. 26, 2022

(51) Int. Cl.
*G06V 10/77* (2022.01)
*G06V 10/771* (2022.01)

(52) U.S. Cl.
CPC ........ *G06V 10/7715* (2022.01); *G06V 10/771* (2022.01); *G06V 2201/07* (2022.01)

(58) Field of Classification Search
USPC ......................................... 382/103, 104, 154
See application file for complete search history.

(56) References Cited

U.S. PATENT DOCUMENTS

| | | | |
|---|---|---|---|
| 2009/0177602 A1* | 7/2009 | Ning | B60W 40/09 706/21 |
| 2021/0101619 A1* | 4/2021 | Weast | G06N 7/005 |
| 2022/0187837 A1* | 6/2022 | Tebbens | B60W 60/0013 |
| 2022/0324464 A1* | 10/2022 | Collin | G06F 11/3688 |

OTHER PUBLICATIONS

Ning et al., A General Frame to Detect Unsafe System States From Multisensor Data Stream, 2009 IEEE 1524-9050, IEEE Transaction on Intelligent System, vol. 11 No. 1, Mar. 2010, pp. 1-15. (Year: 2010).*
[No Author Listed], "Surface Vehicle Recommended Practice: Taxonomy and Definitions for Terms Related to Driving Automation Systems for On-Road Motor Vehicles," SAE International, Standard 3016, Sep. 30, 2016, 30 pages.

* cited by examiner

*Primary Examiner* — Ishrat I Sherali
(74) *Attorney, Agent, or Firm* — Fish & Richardson P.C.

(57) ABSTRACT

Provided are methods for efficient and optimal feature extraction, which can include identifying observations that satisfy a predetermined configuration of metrics. Some methods described also include extracting feature values of a respective metric from the identified observations and determining parameters for feature extraction based on the feature values extracted from the identified observations and a respective label of the identified observations. Systems and computer program products are also provided.

20 Claims, 14 Drawing Sheets

800A

| Observations 602 | Metrics 606 | Classifications 604 |
|---|---|---|
| Trajectories, i.e. series of car poses and scenario information, such as map, lanes, other actors, road signs. 602A | Metrics from the trajectories such as:<br>- Likelihood of traffic conflict<br>- Lateral clearance to other vehicles<br>- Total advancement 606A | Best trajectory from a certain state of the car, among the one available, such as overtake, do not overtake, pass in front, pass behind 604A |
| Humans 602B | Expert metrics: Cardiovascular tone, Breathing Score, Activity Score, Cardiac Health, Age, Number of visits to the GP for the past X months 606B | Is this individual healthy? Does he need a check up at a clinic? 604B |

620 ↗ (pointing to 602A)
630 ↗ (pointing to 602B)

EFFICIENT AND OPTIMAL FEATURE EXTRACTION FROM OBSERVATIONS

BACKGROUND

Machine learning systems learn from datasets using varied techniques. The datasets are labeled according to features associated with observations of the datasets.

BRIEF DESCRIPTION OF THE FIGURES

FIG. 6 shows high dimensionality observations, features, and classifications.

DETAILED DESCRIPTION

Figure 1:
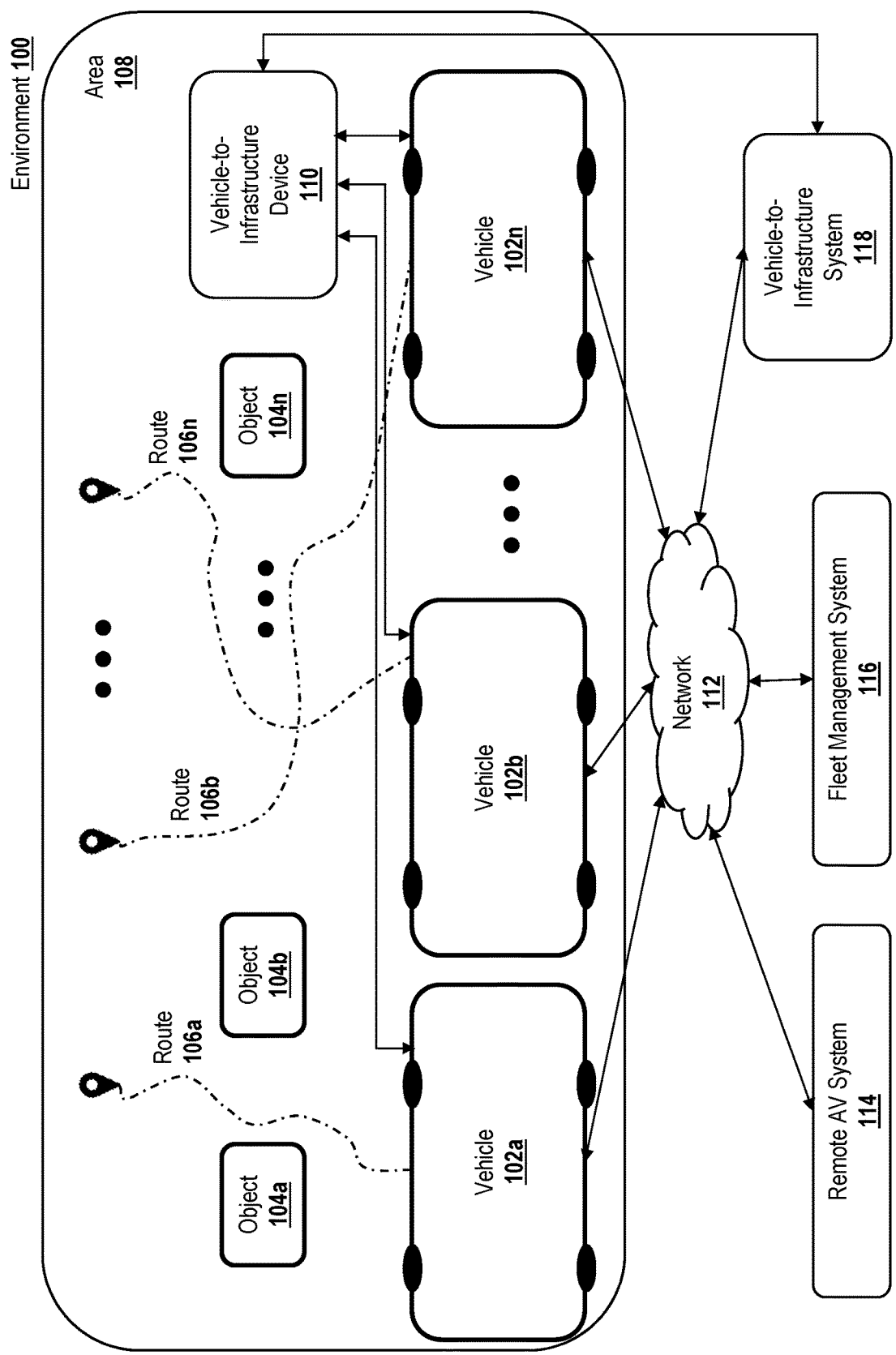
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement efficient and optimal feature extraction from observations. Observations are identified observations that satisfy a predetermined configuration of metrics. Feature values are extracted from the observations representative of a metric of the predetermined configuration of metrics. Parameters are determined for feature extraction based on the feature values extracted from the identified observations and a respective label of the identified observations.

By virtue of the implementation of systems, methods, and computer program products described herein, techniques for efficient and optimal feature extraction. The present techniques enable exploration and extraction of observations with a high dimensionality. The present techniques eliminate time-consuming, hand-crafted representative features. The present techniques automatically extract hidden features from each observation (e.g., planned trajectories in traffic), which form the input to a machine learning system. Machine learning systems can then use these features to make higher level decisions. The features are extracted without knowledge of the particular machine learning systems that will consume the data. In this manner, parameter tuning of the machine learning models is avoided, as it is tedious, inefficient, and forms a bottleneck for many trained systems.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and ends at a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure or Vehicle-to-Everything (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
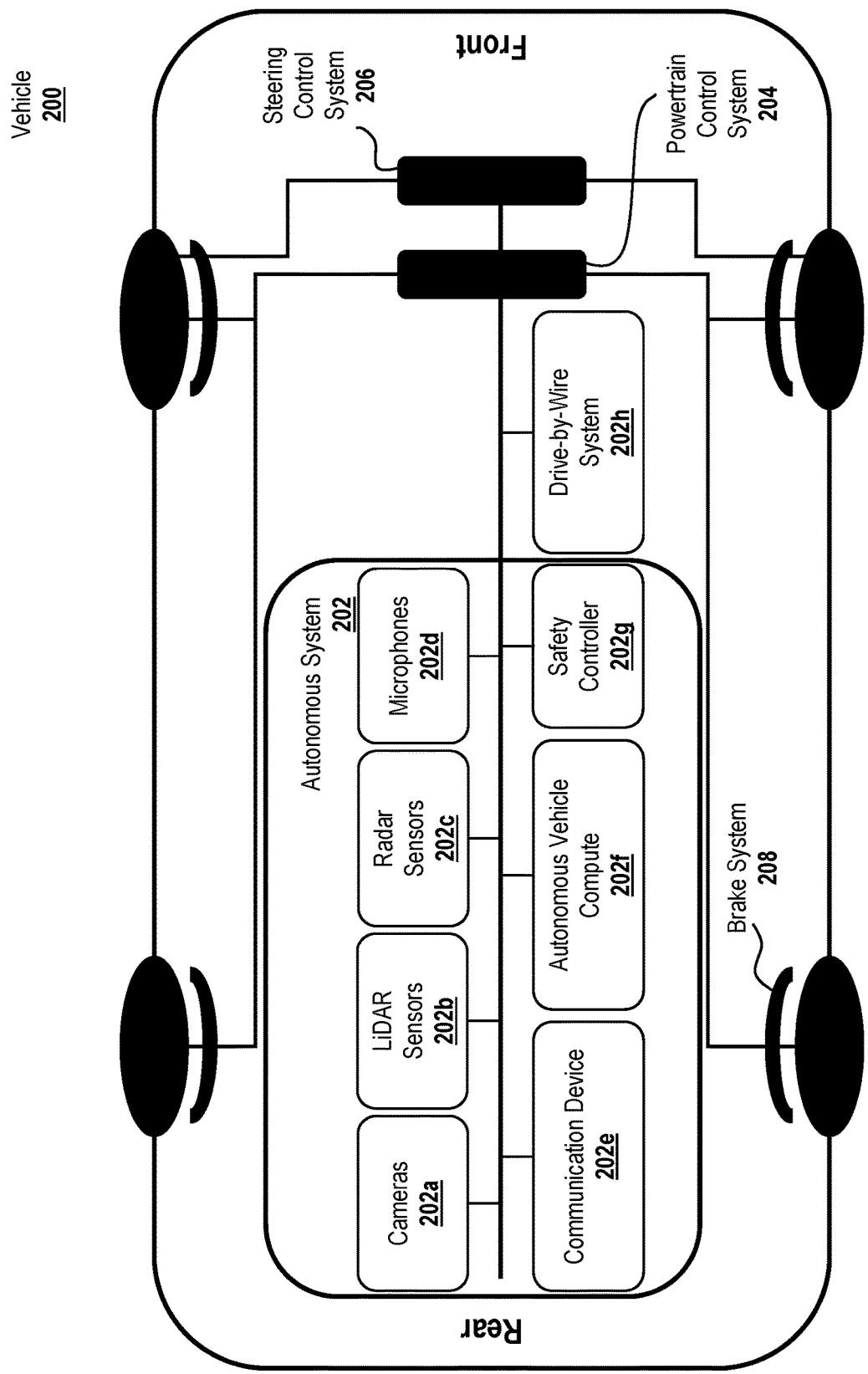
FIG. 2 is a diagram of one or more systems of a vehicle including an autonomous system.

Referring now to FIG. 2, vehicle 200 (which may be the same as, or similar to vehicles 102 of FIG. 1) includes or is associated with autonomous system 202, powertrain control system 204, steering control system 206, and brake system 208. In some embodiments, vehicle 200 is the same as or similar to vehicle 102 (see FIG. 1). In some embodiments, autonomous system 202 is configured to confer vehicle 200 autonomous driving capability (e.g., implement at least one driving automation or maneuver-based function, feature, device, and/or the like that enable vehicle 200 to be partially or fully operated without human intervention including, without limitation, fully autonomous vehicles (e.g., vehicles that forego reliance on human intervention such as Level 5 ADS-operated vehicles), highly autonomous vehicles (e.g., vehicles that forego reliance on human intervention in certain situations such as Level 4 ADS-operated vehicles), conditional autonomous vehicles (e.g., vehicles that forego reliance on human intervention in limited situations such as Level 3 ADS-operated vehicles) and/or the like. In one embodiment, autonomous system 202 includes operational or tactical functionality required to operate vehicle 200 in on-road traffic and perform part or all of Dynamic Driving Task (DDT) on a sustained basis. In another embodiment, autonomous system 202 includes an Advanced Driver Assistance System (ADAS) that includes driver support features. Autonomous system 202 supports various levels of driving automation, ranging from no driving automation (e.g., Level 0) to full driving automation (e.g., Level 5). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, drive-by-wire (DBW) system 202h, and safety controller 202g.

Figure 3:
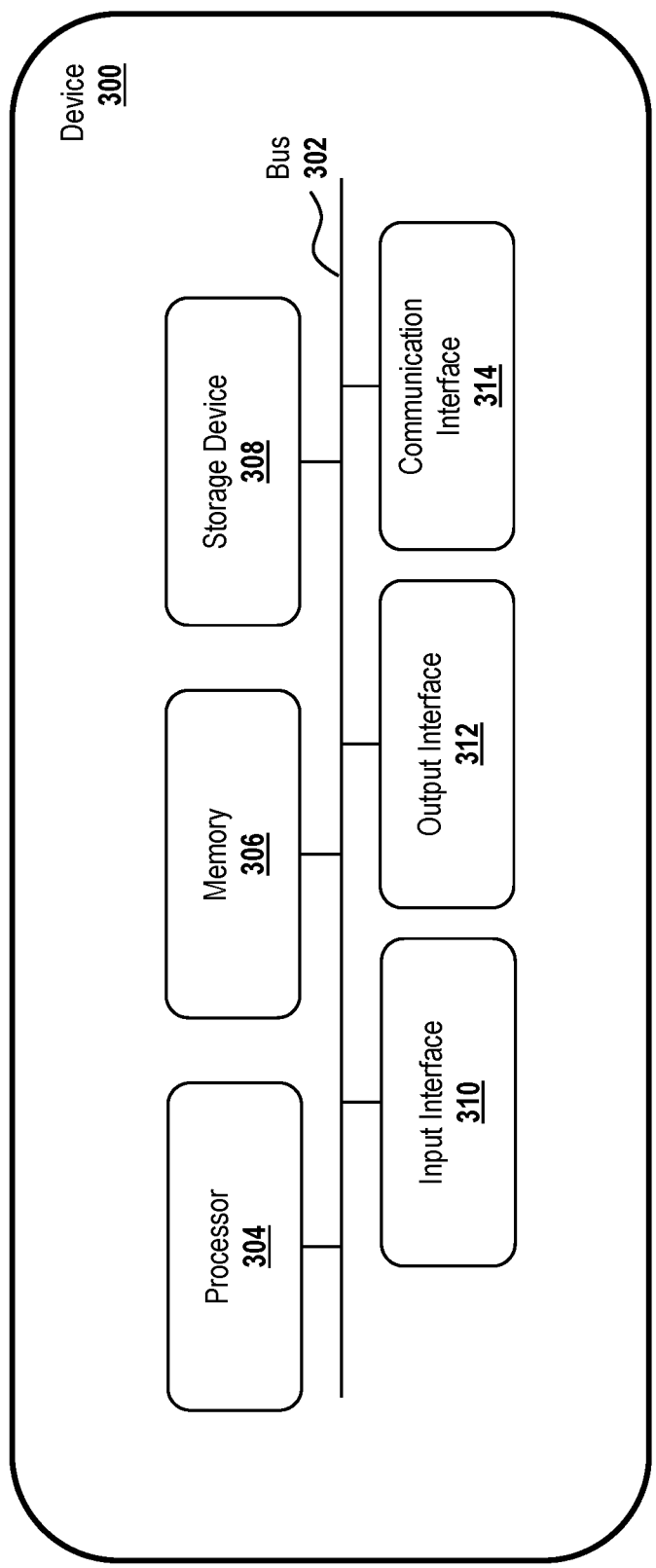
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a Charge-Coupled Device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD (Traffic Light Detection) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Light Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e includes at least one device configured to be in communication with cameras 202a, LiDAR sensors 202b, radar sensors 202c, microphones 202d, autonomous vehicle compute 202f, safety controller 202g, and/or DBW (Drive-By-Wire) system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to make longitudinal vehicle motion, such as start moving forward, stop moving forward, start moving backward, stop moving backward, accelerate in a direction, decelerate in a direction or to make lateral vehicle motion such as performing a left turn, performing a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right. In other words, steering control system 206 causes activities necessary for the regulation of the y-axis component of vehicle motion.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like. Although brake system 208 is illustrated to be located in the near side of vehicle 200 in FIG. 2, brake system 208 may be located anywhere in vehicle 200.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102) and/or one or more devices of network 112 (e.g., one or more devices of a system of network 112). In some embodiments, one or more devices of vehicles 102 (e.g., one or more devices of a system of vehicles 102) and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a Wi-Fi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
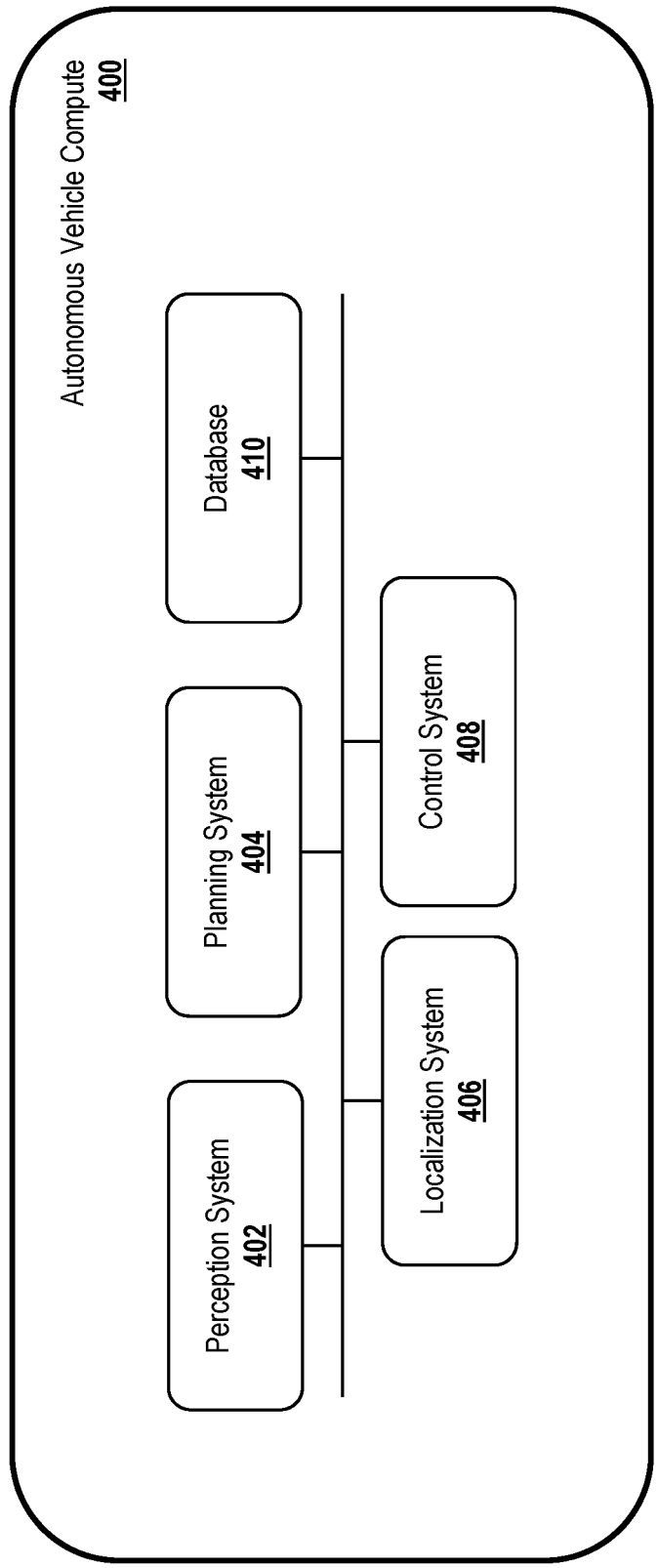
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In other words, planning system 404 may perform tactical function-related tasks that are required to operate vehicle 102 in on-road traffic. Tactical efforts involve maneuvering the vehicle in traffic during a trip, including but not limited to deciding whether and when to overtake another vehicle, change lanes, or selecting an appropriate speed, acceleration, deacceleration, etc. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. For example, control system 408 is configured to perform operational functions such as a lateral vehicle motion control or a longitudinal vehicle motion control. The lateral vehicle motion control causes activities necessary for the regulation of the y-axis component of vehicle motion. The longitudinal vehicle motion control causes activities necessary for the regulation of the x-axis component of vehicle motion. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
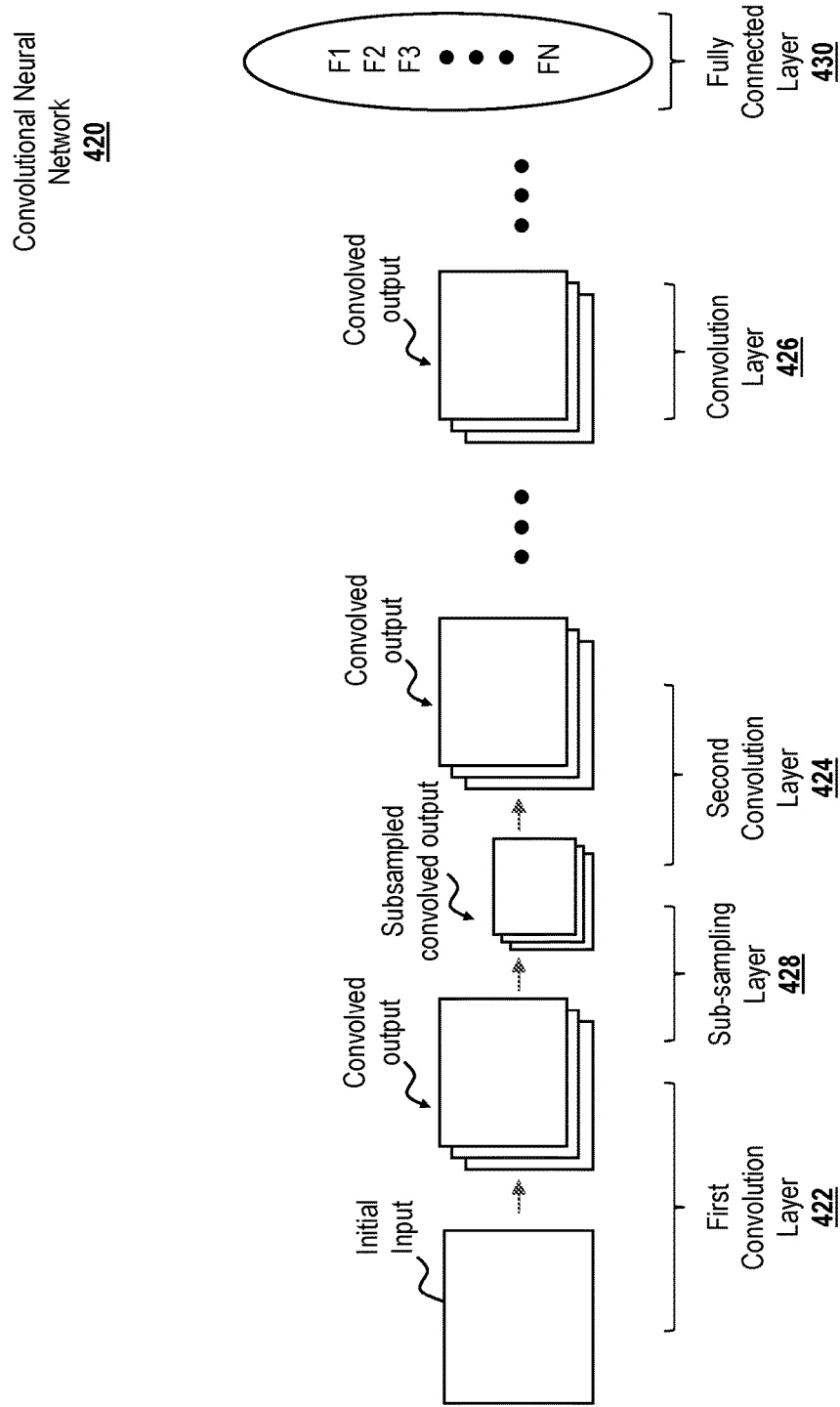
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 ... FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, ... FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
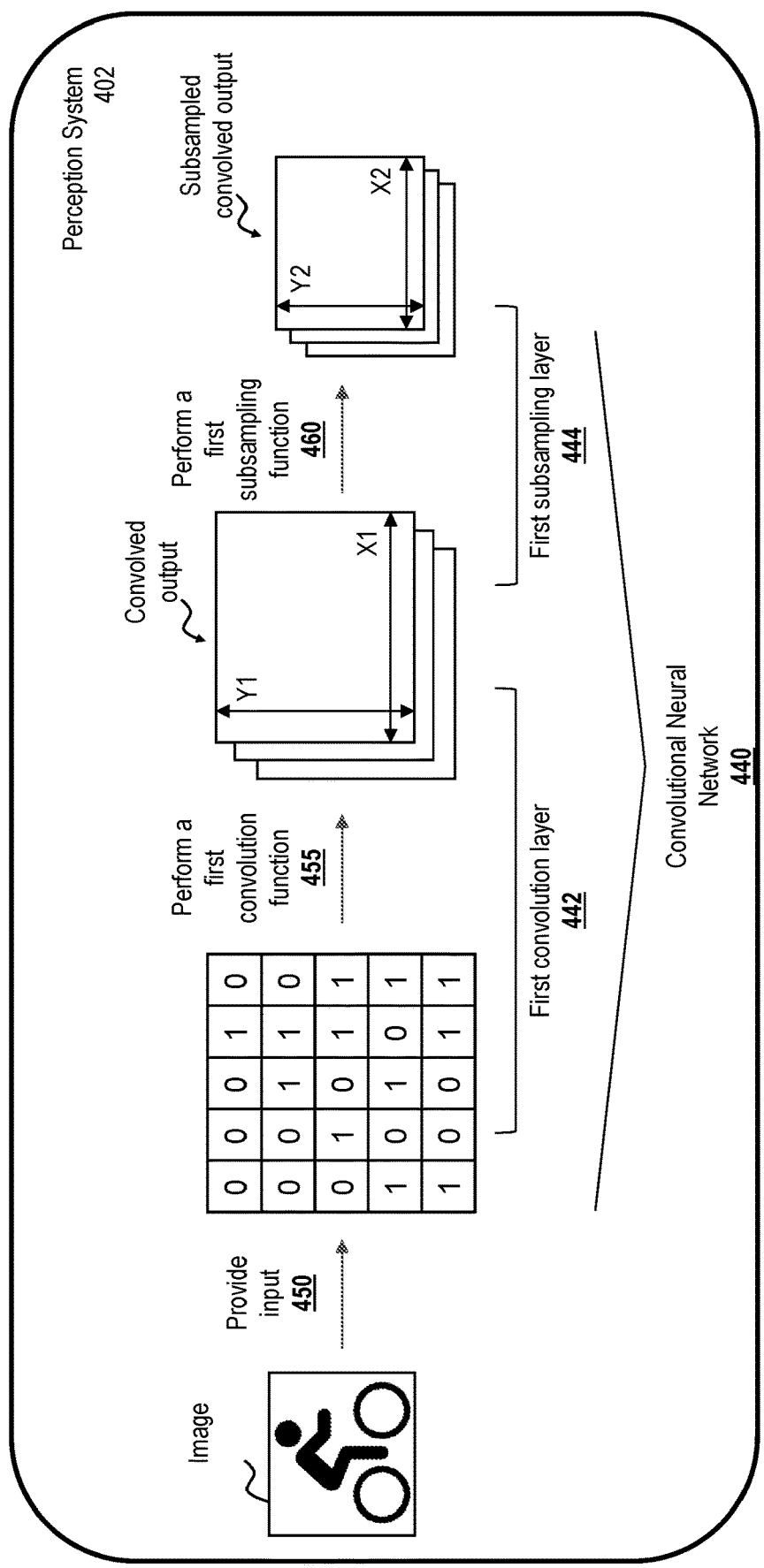
FIGS. 4C and 4D are a diagram illustrating example operation of a CNN.
Figure 4D:
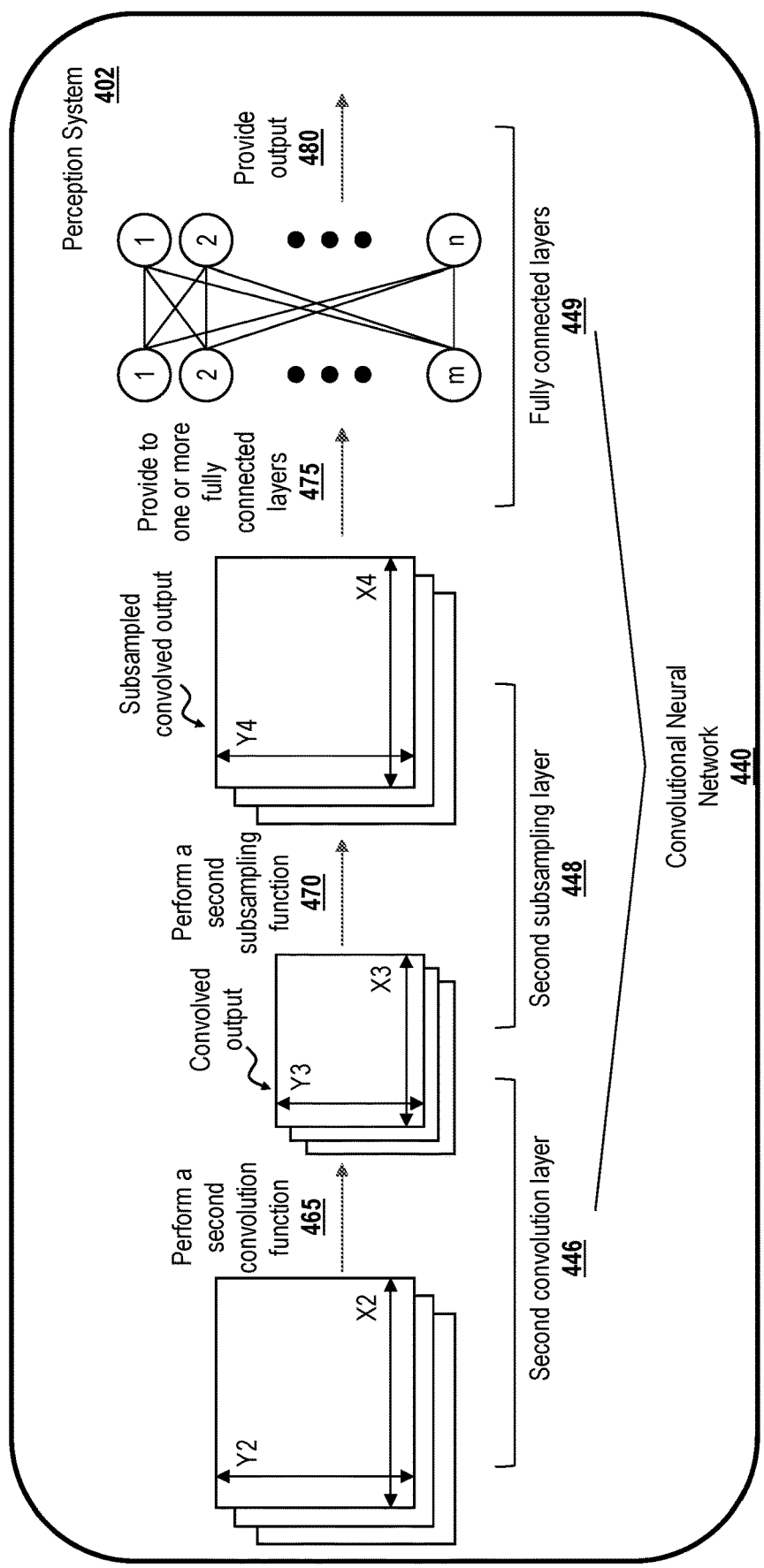

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
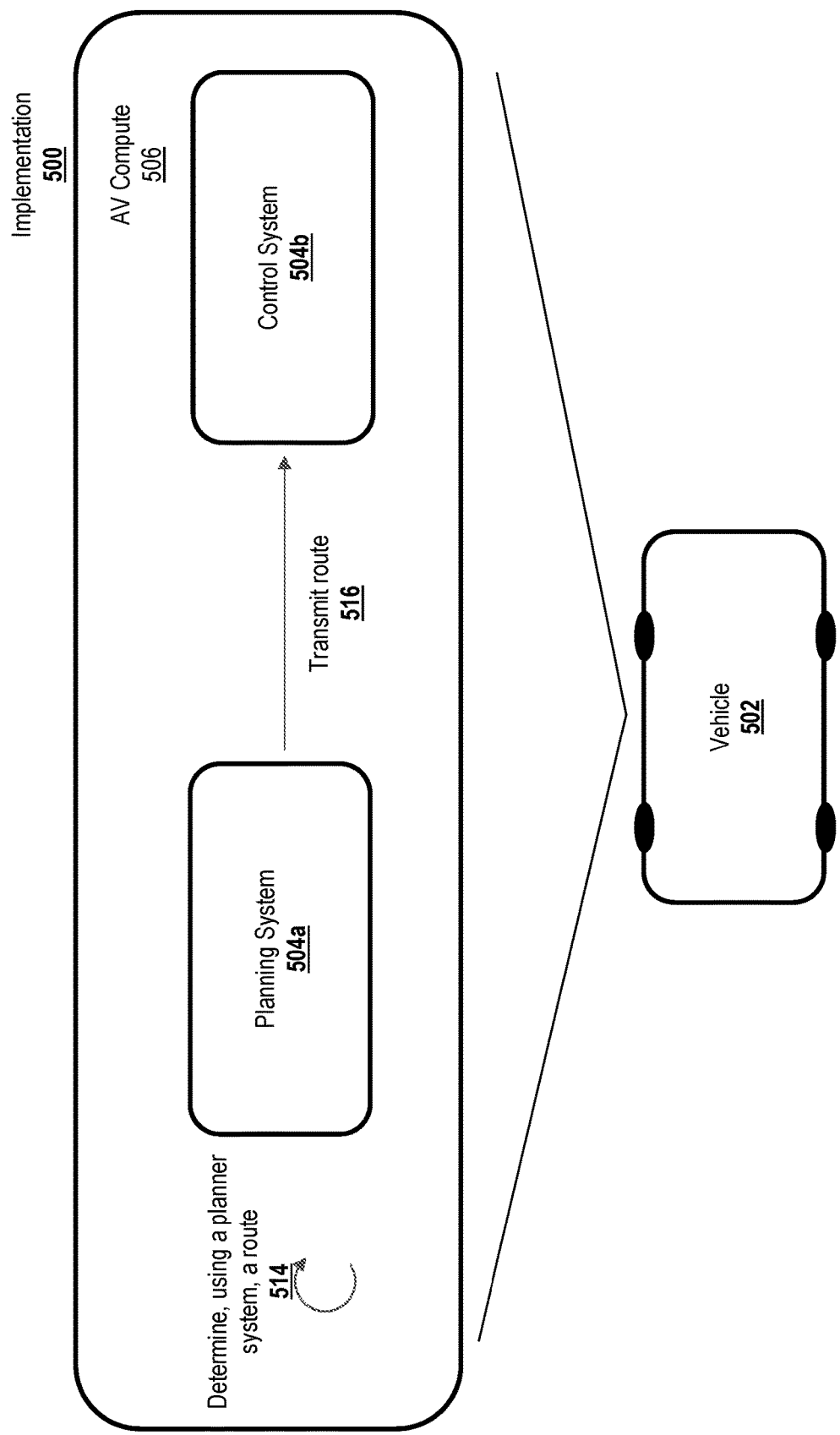
FIG. 5 is a diagrams of an implementation of a process for efficient and optimal feature extraction from observations.

Referring now to FIG. 5, illustrated are diagrams of an implementation 500 of a process for efficient and optimal feature extraction from observations. In some embodiments, implementation 500 includes AV compute 506 that is implemented in an autonomous navigation system of a vehicle 502. The AV compute 506 is the same or similar to AV compute 400 of FIG. 4. The AV compute 506 includes a planning system 504a (e.g., 404 of FIG. 4) and a control system 504b (e.g., control system 408 of FIG. 4).

In examples, the planning system 504a determines a route (514) that the AV 502 travels through the environment (e.g., environment 100 of FIG. 1). The route is transmitted (516) to the control system 504b, which controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate.

The AV compute 506 executes machine learning systems to enable autonomous navigation of the vehicle 502. In examples, the machine learning model is the same as or similar to the machine learning model described above with respect to FIGS. 4B-4D. In examples, the machine learning models include various machine learning techniques, such as supervised learning, semi-supervised learning, unsupervised learning, and reinforcement learning. A machine learning model is trained by learning from existing datasets that include observations. In some embodiments, the observations are an instance, scenario, unit, or sample of a dataset. Observations are associated with labels. In examples, the labels are additional information known about an observation, where the additional information is based on prior knowledge.

Features are values or characteristics of respective observations in a dataset. In some embodiments, features are the input to the machine learning model and labels are the output of the machine learning models. Modelling real-world decision making problems often involves working with raw data objects of high dimensionality (observations) as input. In safety-critical applications, engineers typically extract a set of hand-crafted representative features (hidden features) from each observation (e.g planned trajectories in traffic), which form the input to a machine learning system. Machine learning systems can then use these features to make higher level decisions. In some embodiments, machine learning models include parameters that are configuration variables internal to the machine learning model. In some embodiments, training the machine learning model includes estimating the parameters using features extracted from the given dataset. Traditionally, extracting the features involves some parameter tuning, which is dependent on particular machine learning system to be trained. Adjusting these parameters is tedious and inefficient, forming a bottleneck for many trained systems.

In some embodiments, hidden features are extracted from datasets and used to train machine learning systems, such as the machine learning systems of the AV compute 506. The features are automatically extracted by selecting particular observations with a predetermined configuration of metrics. In some embodiments, the metrics are based on, at least in part, a domain of the dataset. For example, the metrics are known standards used to evaluate observations of a dataset. In examples, the metrics are evaluation metrics that measure the performance of machine learning systems. In examples, the predetermined configuration of metrics refers to a pattern or predetermined occurrences of metrics in observations of the dataset.

FIG. 6 shows high dimensionality observations, metrics, and classifications. As shown in FIG. 6, datasets 620 and 630 are specific examples in varying domains of observations 602, metrics 606, and classifications 604. FIG. 6 shows examples of observations, metrics, and classifications used in efficient and optimal feature extraction from the observations. The observations 602 are evaluated to determine classifications 604. In examples, the classifications 604 are a type of label associated the observations. In some embodiments, the classifications 604 are assigned to observations 602 prior to identifying a machine learning model to be trained. The observations 602 and classifications 604 may be, for example, a labeled dataset. A labeled dataset is obtained, and in some embodiments metrics 606 are applied to evaluate the observations, without reliance on an underlying algorithm or machine learning system. In examples, the metrics are agnostic to the machine learning system being trained. Put another way, the metrics are used to evaluate aspects of the observation regardless of the particular machine learning model to be trained. In some embodiments, the metrics are satisfied or met when an event that occurs during the observation meets a rule, threshold, or parameter of the metric. Using a predetermined configuration of metrics, features of the dataset are extracted.

In the example of FIG. 6, a dataset 620 including observations 602A is illustrated. The observations include trajectories (e.g., routes 106 of FIG. 1). In some embodiments, the trajectories include a series of car poses and scenario information, such as a map, lanes, other actors, road signs, and the like. The trajectories are classified (e.g., labeled) as being a best trajectory based on states of the vehicle (604A). The states may be, for example, overtake, do not overtake, pass in front, pass behind. The present techniques enable efficient and optimal feature extraction from the observations. For example, the metrics 606A are used to evaluate the observations 602A. Using a predetermined configuration of metrics 606A, hidden features are extracted that are input to machine learning models for training, testing, or verification of the machine learning models. In the example of FIG. 6, the metrics 606A are traffic safety metrics. For example, the metrics 606A include a likelihood of traffic conflict (e.g., averaged over Y time steps), lateral clearance to other vehicles (e.g., within X threshold), total advancement, and the like.

At dataset 630, observations 602B are illustrated. The observations 602B include humans. The humans are classified (e.g., labeled) as being a healthy or unhealthy individual based on states of the individual (604B). The present techniques enable efficient and optimal feature extraction from the observations. For example, the metrics 606B used to evaluate the observations 602B. Using a predetermined configuration of metrics 606B, hidden features are extracted that are used to train, test, or verify a machine learning model. In the example of FIG. 6, the metrics 606B are expert metrics provided by a healthcare professional. For example, expert metrics include cardiovascular tone, breathing score, activity score, cardiac health, age, number of visits to the doctor for the past X months, and the like.

The present techniques include an algorithm that efficiently learns and optimizes hidden features from observations without retraining machine learning models or relying on the machine learning systems which make use of the features. In examples, machine learning systems making use of these extracted features achieve greater performance when compared to traditional machine learning systems, even though the feature extraction process is decoupled from the parameters of the machine learning system. Traditionally, feature extraction from observations is done by extracting as many features as possible. For example, at the datasets 620 and 630 traditional techniques blindly extract as much information from the observations 602A and 602B as possible, such as traffic information from trajectories and biological information from a human. However, this is typically inefficient and sub-optimal. In other traditional approaches, typically after feature extraction and training a machine learning system, the feature extraction process is manually tuned, which is highly inefficient. The present techniques perform automatic feature extraction in a data-driven approach without knowing the models beforehand. As a result, the feature extraction process can be shown to be optimal and well suited for the training machine learning systems.

Figure 7A:
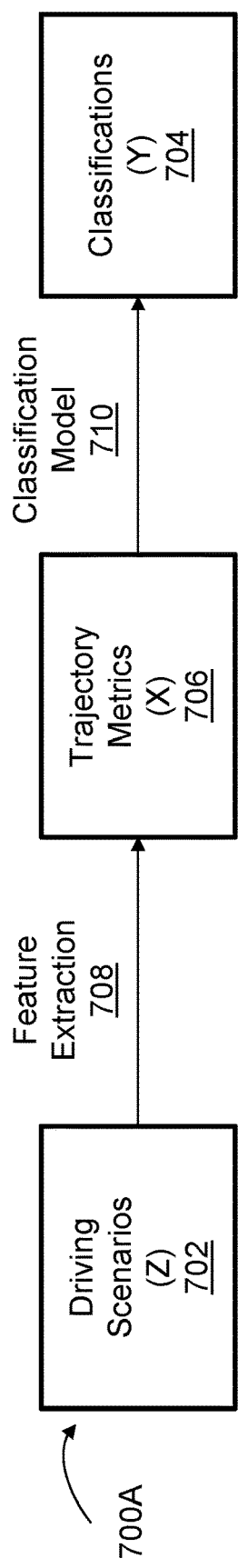
FIG. 7A is a block diagram of a feature extraction pipeline.
Figure 7B:
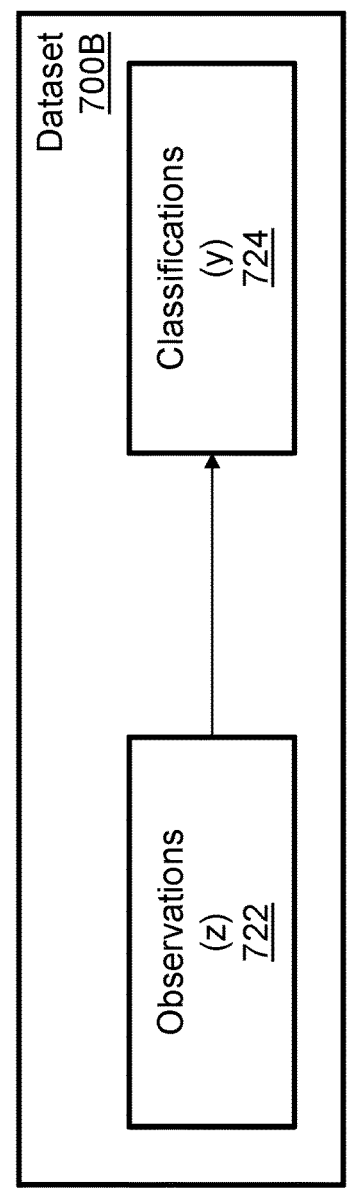
FIG. 7B is a block diagram of a dataset.

FIG. 7A is a block diagram of a feature extraction pipeline 700A. For ease of description, the feature extraction pipeline 700A is described using underlying data in an autonomous driving domain. However, the present techniques enable feature extraction in any domain as described with respect to FIG. 7B. FIG. 7B is a block diagram of a dataset 700B. In examples, the training data available to optimize the described classifier are a collection of observations (z) 722 and the relative classifications (y) 724. FIG. 7B shows a dataset 700B from a domain, with observations (z) 722 such as driving scenarios or a human body, and classifications (y) such as whether the driving scenario is good or whether the human is healthy respectively. In the dataset 700B, there is no ground truth value to determine features of the observations.

Referring again to FIG. 7A, the feature extraction pipeline 700A includes driving scenarios (Z) 702 (e.g., observations 602 of FIG. 6), trajectory metrics (X) 706 (e.g., metrics 606), and classifications (Y) 704 (e.g., classifications 704 of FIG. 7). The classifications (Y) 704 refer to whether the driving scenarios (Z) 702 are good or bad (e.g., safe or unsafe) based on respective trajectories of the driving scenarios (Z) 702. The present techniques provide efficiently and optimally extract features as guided by a predetermined configuration of metrics. For example, the traffic safety metrics (e.g., metrics (X) 706) are used to extract features from driving scenario (Z) 702, which includes a driving trajectory and the surrounding traffic context. In examples, the driving scenarios (Z) 702 are composed of an ego vehicle's state, a map, and agents present in the scene. A set of metrics (X) 706 is obtained and are used to operate a selection/classification (Y) 704 among a set of alternative trajectories proposed by one/multiple planning algorithm. The trajectory metrics (X) 706 are computed from the driving scenarios (Z) 702 via a set of parametric functions which present a set of parameters.

For example, a trajectory metric (X) is a binary metric refer to as a "lateral clearance violation." This metric is evaluated according to a rule that includes a threshold parameter. For example, if the AV's trajectory is within X meters laterally of another moving traffic agent (e.g., an event), then the metric returns a 1 indicating that a lateral clearance violation has occurred. Otherwise, the metric is 0, indicating that a lateral clearance violation has not occurred. As such, the metric is governed by a parameter (X), which is determined prior to selecting, training, testing, or verifying machine learning models. Traditionally, this parameter is chosen manually. The present techniques automatically select an optimal parameter from the datasets (e.g., observations and classifications) without any prior decision on the model evaluated by the metric. Feature extraction and parameter determination is further described with respect to FIG. 8A.

Figure 8A:
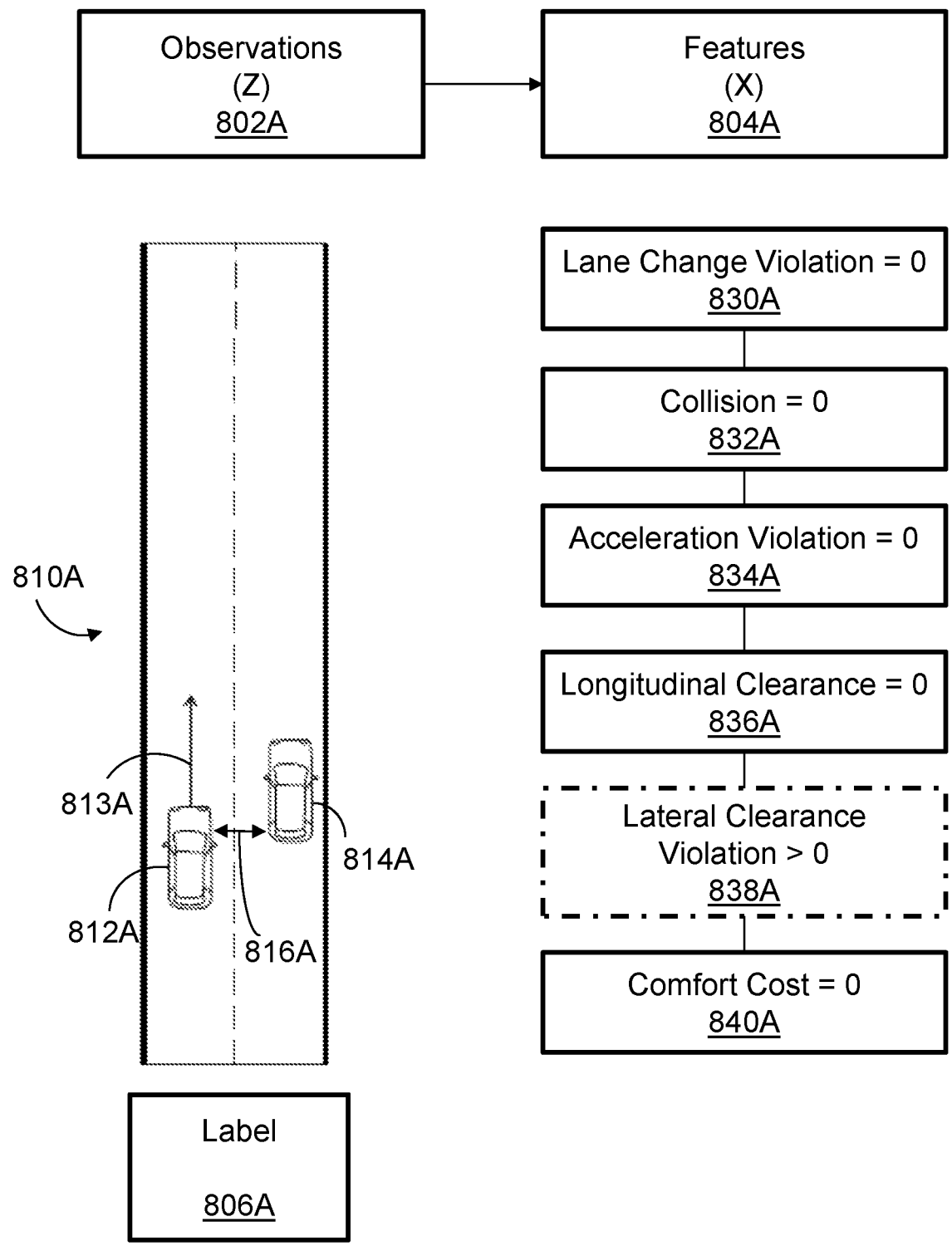
FIGS. 8A-8C are an illustration of a feature extraction system in the context of route planning.

FIG. 8A is an illustration of a feature extraction system 800B in the context of route planning. In the example of FIG. 8A, observations 802A include a scenario 810A. The scenario 810A has a known label 806A. In the scenario 810A, an ego vehicle 812A (e.g., AV) travels in a lane going the same direction as a vehicle 814A traveling in a neighboring lane, as shown by arrow 813A. A predetermined configuration of metrics 830A, 832A, 834A, 836A, 838A, and 840A is shown. In the example of FIG. 8A, the scenario 810A (e.g., an observation) satisfies a predetermined configuration of metrics 830A, 832A, 834A, 836A, 838A, and 840A with a single non-zero valued metric across the metrics 830A, 832A, 834A, 836A, 838A, and 840A found in the observation. For ease of description, the predetermined configuration of metrics is described as a single non-zero valued metric, however any metric with a distinct value when compared to other metrics applied to the observation can be used. Additionally, for purposes of description, the label 806A classifies the scenario 810A as exhibiting good behavior by the ego vehicle 812A.

To determine the optimal parameters for feature extraction, the feature extraction process is initialized by selecting an initial, reasonable value of features corresponding to the single non-zero valued metric 838A. The feature values are iteratively extracted from the observations in the dataset with the predetermined configuration of metrics. For example, the scenario 810A exhibits a lateral clearance violation, as the corresponding metric is the single non-zero valued metric. Based on the known information regarding the scenario 810A, a lateral clearance feature value is extracted from the scenario 810A, and the extracted lateral clearance value is known to not be a violation of lateral clearances since the label 806A identifies the scenario 810A as good behavior. In some embodiments, other features include lane change violation, traffic conflict, acceleration violation, longitudinal clearance, and comfort cost.

The unchanged, non-zero feature values (e.g., datapoints) are extremely informative because, first, regardless of the machine learning system and machine learning system parameters that subsequently is trained, tested, or verified using these features, the classification of these features (which are mostly zero except for one) is inferred from the label without any assumption on how the model behaves. In some embodiments, the feature extraction parameters are turned on these data-points optimally without any assumptions on the machine learning system's parameters.

In the example of FIG. 8A, a lateral clearance feature is extracted from the observations, which is determined by checking if a lateral distance between the ego vehicle 812A is within a certain threshold (e.g., a feature extraction parameter or value) from the vehicle 814A. In this example, the scenario 810A contains a lateral clearance violation. However, the label of the dataset is "good behavior," thus the lateral clearance violation should not be present. As such, the lateral threshold parameter is optimally determined to be less than the lateral clearance 816A. For example, the lateral clearance 816A observed in the scenario 810A is 1.6 m. Since the scenario 810A is labeled as good behavior and no actual lane clearance violation is present, it follows that 1.6 m is a safe clearance. Multiple observations falling under the same category are analyzed to determine the optimal clearance threshold which minimizes the error rate for all given scenarios. As such, without explicit knowledge on the machine learning system that converts the features 804A into the label 806A, the feature extraction process is optimally tuned.

In some embodiments, the feature extraction parameters are optimized. From the previous example, it is determined that 1.6 m is outside a lateral clearance violation threshold. When multiple observations are evaluated, each with the same predetermined configuration of metrics, varying lateral clearances are extracted (1.2 m, 1.5 m, etc.) with different labels of whether the observations are safe/good. Some of the identified useful observations might even be conflicting with each other (e.g., an observation of 1.2 m might be regarded as good but a 1.4 m might be regarded as undesirable from the labels; this is entirely possible because driving data may be noisy). In some embodiments, Bayesian optimization is used to reconcile these differences and pick an optimal parameter for each feature, which minimizes the error rate across all data points. In some embodiments, the extracted features values are used as input to machine learning systems that enable trajectory proposal, determination of a trajectory cost function (hierarchal), trajectory selection, and homotopy selection.

Figure 8B:
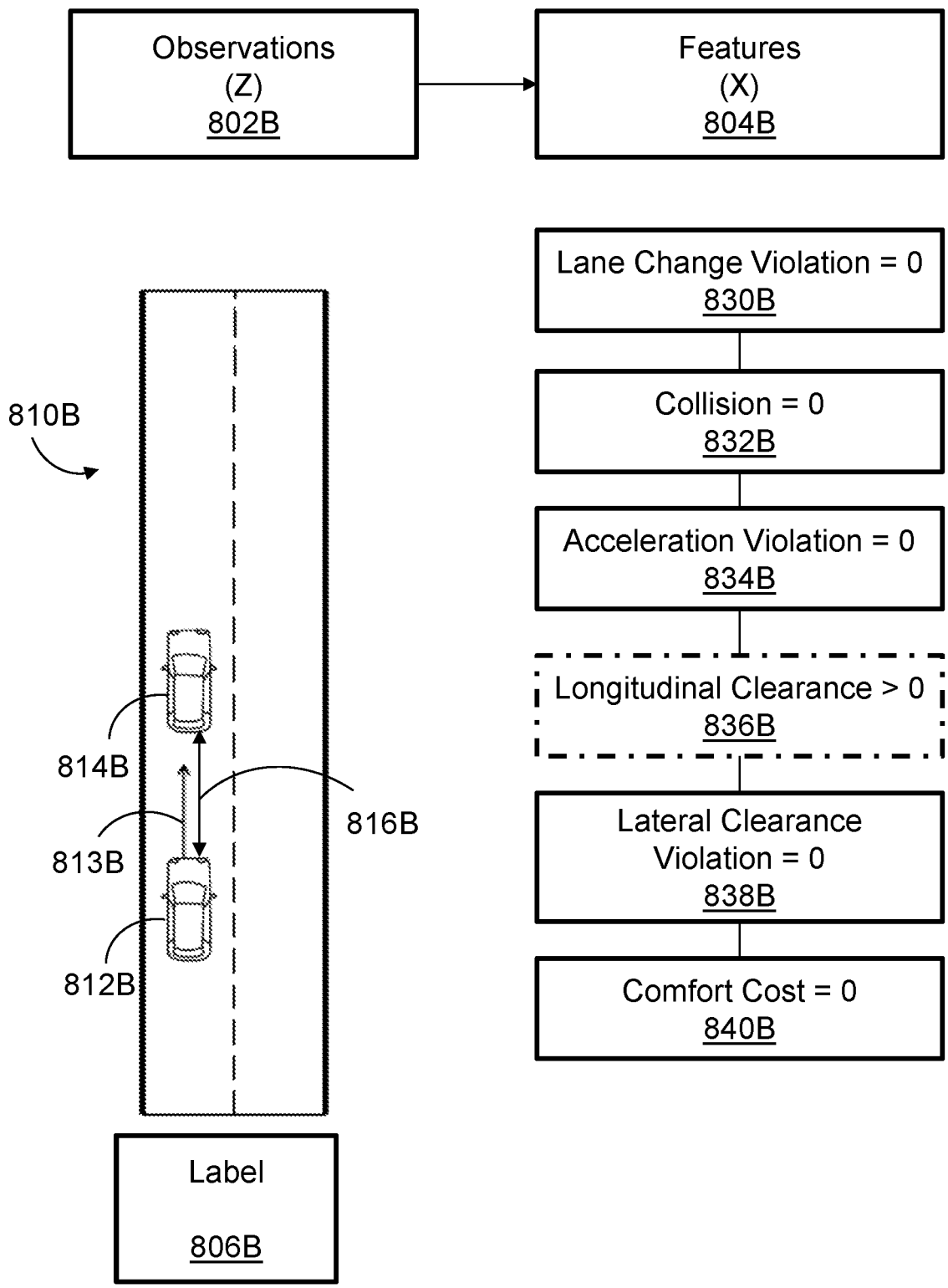

FIG. 8B is an illustration of a feature extraction system 800B in the context of route planning. In the example of FIG. 8B, observations 802B include a scenario 810B. The scenario 810B has a known label 806B. In the scenario 810B, an ego vehicle 812B (e.g., AV) travels in a same lane a vehicle 814B and going the same direction as the vehicle 814B, as shown by arrow 813B. A predetermined configuration of metrics 830B, 832B, 834B, 836B, 838B, and 840B is shown. In the example of FIG. 8B, the scenario 810B (e.g., an observation) satisfies a predetermined configuration of metrics 830B, 832B, 834B, 836B, 838B, and 840B with a single non-zero valued metric across the metrics 830B, 832B, 834B, 836B, 838B, and 840B found in the observation. The label 806B classifies the scenario 810B as exhibiting bad behavior by the ego vehicle 812B.

To determine the optimal parameters for feature extraction, the feature extraction process is initialized by selecting an initial, reasonable value of features corresponding to the single non-zero valued metric 838B. The feature values are iteratively extracted from the observations in the dataset. For example, the scenario 810 exhibits a longitudinal clearance violation, as the corresponding metric 836B is the single non-zero valued metric. Based on the known information regarding the scenario 810, a longitudinal clearance feature value is extracted from the scenario 810, and the extracted longitudinal clearance value is known to be a violation of longitudinal clearances since the label 806B identifies the scenario 810 as bad behavior. In some embodiments, other features include lane change violation, traffic conflict, acceleration violation, lateral clearance, and comfort cost.

In the example of FIG. 8B, a longitudinal clearance feature is extracted from the observations, which is determined by checking if a longitudinal distance between the ego vehicle 812B is within a certain threshold (e.g., a feature extraction parameter or value) from the vehicle 814B. In this example, the scenario 810B contains a longitudinal clearance violation. The label 806B of the dataset is "bad behavior," thus the longitudinal clearance violation should be present. As such, the longitudinal threshold parameter is optimally determined to be at least equal to the longitudinal clearance 816B. For example, the longitudinal clearance 816B observed in the scenario 810B is 2.5 m. Since the scenario 8106 is labeled as bad behavior and a longitudinal clearance violation is present, it follows that 2.5 m is an unsafe clearance. Multiple observations falling under the same category are analyzed to determine the optimal clearance threshold which minimizes the error rate for all given scenarios. As such, without explicit knowledge on the machine learning system that converts the features 804B into the label 806B, the feature extraction process is optimally tuned.

Figure 8C:
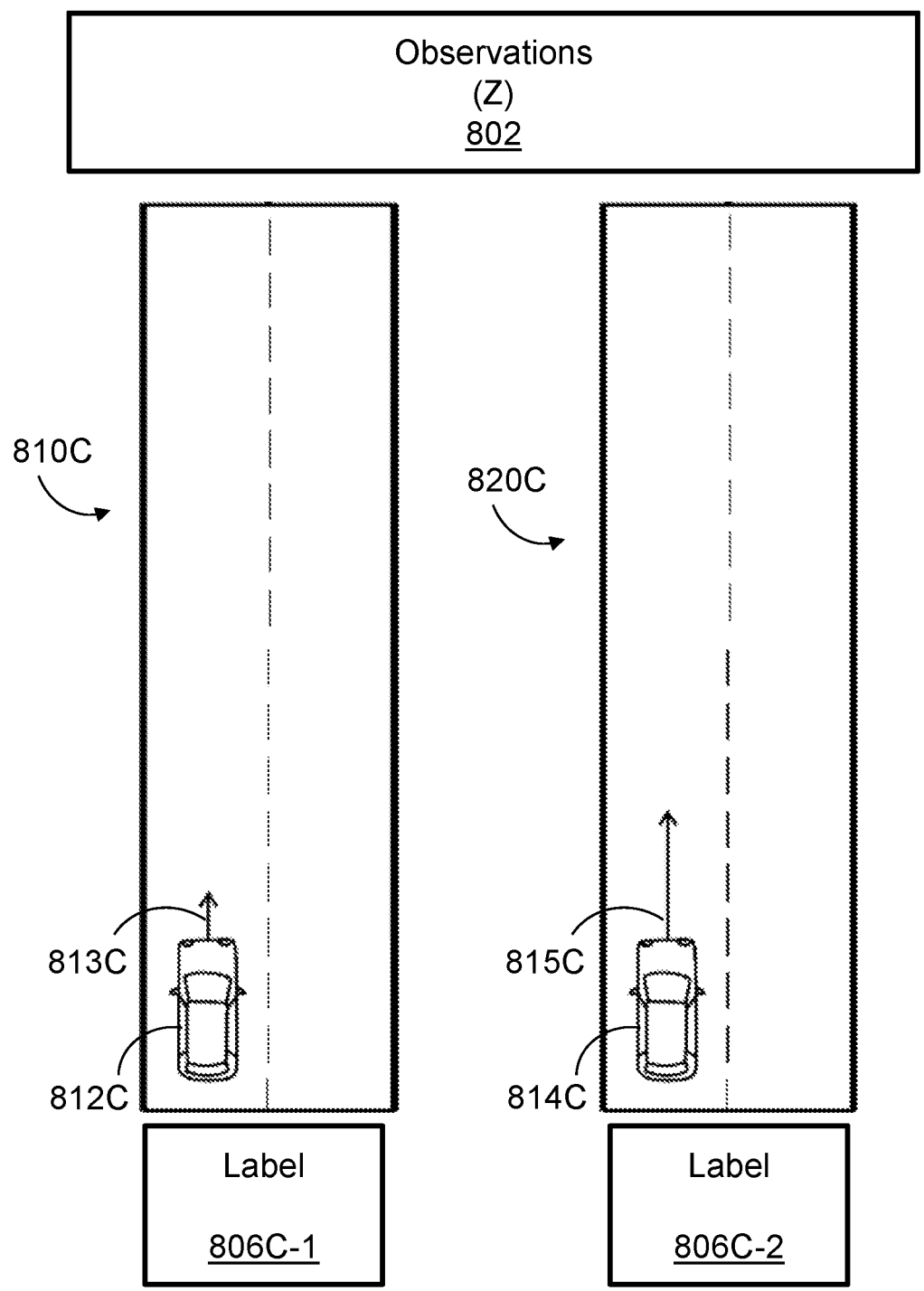

FIG. 8C is an illustration of a feature extraction system 800C in the context of route planning. In the example of FIG. 8C, observations 802C include a scenarios 810C and 820C. The scenario 810C has a known label 806C-1. The scenario 820C has a known label 806C-2. The scenarios 810C and 820C illustrate harsh braking. The scenario 810C illustrates harsh braking at a rate of −2.05 m/s$^2$ as illustrated by arrow 813C. The scenario 820C illustrates harsh braking at a rate of −1.8 m/s$^2$ as illustrated by arrow 815C.

In the scenario 810C, the vehicle 812C brakes at −2.05 m/s$^2$ and is labeled as uncomfortable (e.g., label 806C-1), while in the scenario 820C, the vehicle 814C brakes at −1.8 m/s$^2$ and is labelled as acceptable or comfortable (e.g., label 806C-2). In examples, a predetermined configuration of metrics include a single non-zero value for a deceleration violation metric. In some embodiments, to determine a deceleration violation threshold to extract feature parameters, the threshold is determined to be between −1.8 and −2.05 m/s$^2$ according to the extracted feature values and corresponding labels 806C-1 and 806C-2. In examples, additional data points enable calculation of an optimal threshold to extract the feature parameters. A range of parameters is determined based on the feature values extracted from the identified observations and varying labels of the identified observations. These optimally extracted features can then be used for machine learning classification systems.

Figure 9:
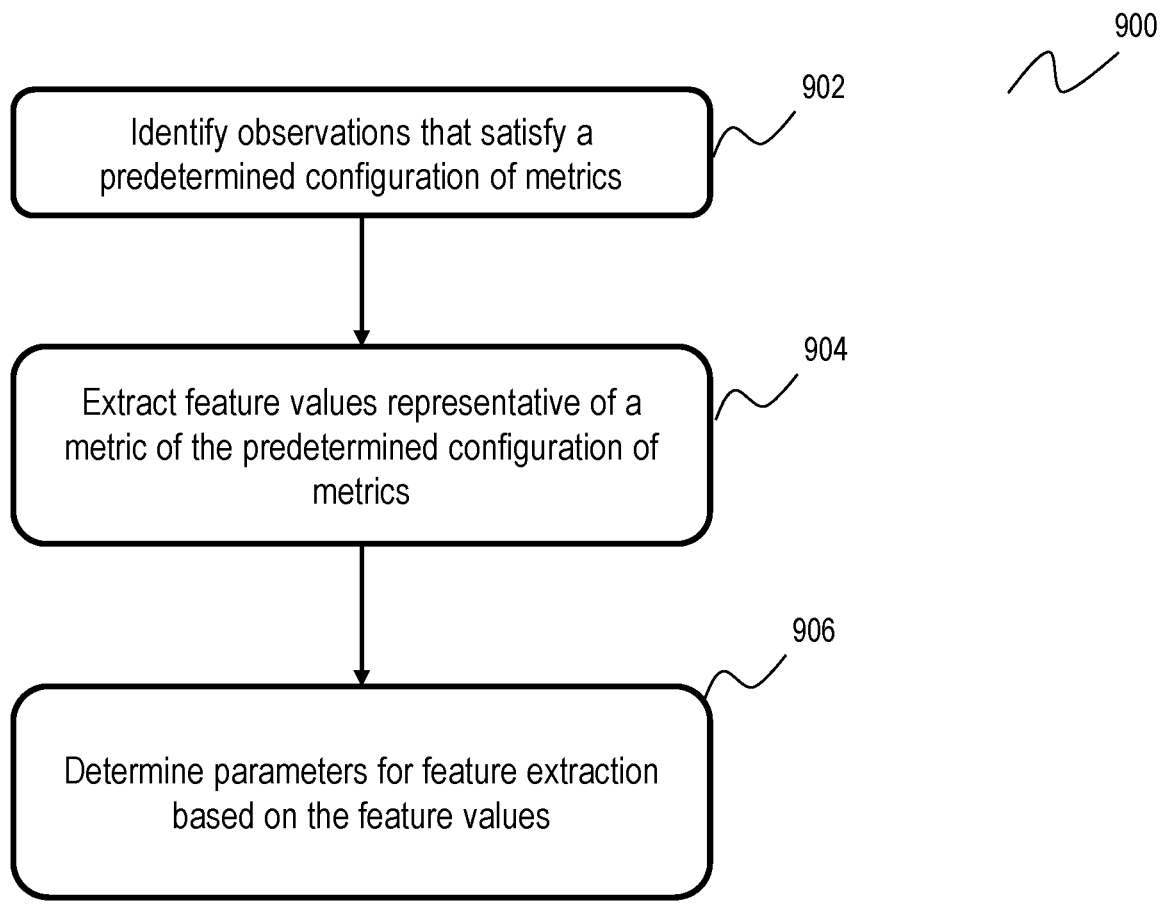
FIG. 9 is a flowchart of a process for efficient and optimal feature extraction from observations.

Referring now to FIG. 9, illustrated is a flowchart of a process 900 for efficient and optimal feature extraction from observations. In some embodiments, one or more of the steps described with respect to process 900 are performed (e.g., completely, partially, and/or the like) by autonomous system 202 of FIG. 2. Additionally, or alternatively, in some embodiments one or more steps described with respect to process 600 are performed (e.g., completely, partially, and/ or the like) by another device or group of devices separate from or including autonomous system 202 such as AV compute 202f of FIG. 2, remote AV system 114 of FIG. 1, fleet management system 116 of FIG. 1, V2I system 118 of FIG. 1, device 300 of FIG. 3, AV compute 400 OF FIG. 4, feature extraction pipeline 700A of FIG. 7A, feature extraction system 800A-C of FIGS. 8A-8C, and the like.

At block 902, observations that satisfy a predetermined configuration of metrics are identified. In examples, the observations are identified from a labeled dataset. In some embodiments, the predetermined configuration of metrics is a same number of events in the observation that satisfy the metric for all but one of the metrics. For examples, the predetermined configuration of metrics is a single non-zero valued metric in the predetermined configuration of metrics. In examples, the observations satisfy the predetermined configuration of metrics when the observations exhibit characteristics of the metrics. The metrics are based on, for example, a domain of the observations.

At block 904, feature values are extracted from the observations, wherein the feature values are representative of a respective metric. The respective metric is specified by the predetermined configuration of metrics. In some embodiments, the respective metric is the metric from the predetermined configuration of metrics with events that vary in the observations, while the remaining metrics are steady state, zero, or some other value. In examples, the respective metric is the metric that does not have the same number of events in the observations. For example, the representative metric is the single non-zero valued metric. In examples, the feature values corresponding to the respective metric are iteratively extracted from observations.

At block 906, parameters for extraction are determined based on the feature values extracted from the observations, wherein the observations are labeled. In examples, the feature values are averaged to determine a threshold for the feature. In examples, the feature values form a range of values, and features are extracted based on being inside or outside of the range of values according to the particular metric or rule.

In some embodiments, the present techniques include an algorithm that can efficiently learn optimized hidden features from observations without needing to retrain or be reliant on the machine learning systems which make use of them. The process is previously difficult to optimize but by identifying unique observations, the present techniques are able to optimally learn a feature extraction process from these observations. In some embodiments, the optimization procedure is able to extract a set of hidden safety features from observed driving data. These hidden features are compatible with different AV machine learning systems and can be used for planning and safety verification. In some embodiments, this pipeline has a direct application in the optimization of the trajectory selector in autonomous vehicle planning algorithms where the hidden features are interpretable as cost and the output of the classification is a label which indicates the best trajectory out of a pair of them. The selection pipeline can also be used to create sub-types for trajectories, in fact selecting the points in which the feature vectors have a particular form can help identify particular scenario in the road. For example, trajectory sub-types include trajectories near or inside an intersection, trajectories in particular driving scenarios such as pick-up and drop-off regions (e.g. hotel lobby, flight departure/arrival zones, event venues, etc.), and high speed trajectories on highways. In examples, trajectory sub-types are created after feature (metric) extraction over the trajectory/driving scenarios. After extraction, scenarios with similar metric/features are grouped together and trajectories/driving scenarios belonging to the same sub-type are identified.

According to some non-limiting embodiments or examples, provided is a method, comprising: identifying, with at least one processor, observations that satisfy a predetermined configuration of metrics; extracting, with the at least one processor, feature values of a respective metric from the identified observations, wherein the respective metric is specified by the predetermined configuration of metrics; and determining, with the at least one processor, parameters for feature extraction based on the feature values extracted from the identified observations and a respective label of the identified observations.

According to some non-limiting embodiments or examples, provided is a system, comprising: at least one processor, and at least one non-transitory storage media storing instructions that, when executed by the at least one processor, cause the at least one processor to: identify observations that satisfy a predetermined configuration of metrics; extract feature values of a respective metric from the identified observations, wherein the respective metric is specified by the predetermined configuration of metrics; and determine parameters for feature extraction based on the feature values extracted from the identified observations and a respective label of the identified observations.

According to some non-limiting embodiments or examples, provided is at least one non-transitory storage media storing instructions that, when executed by at least one processor, cause the at least one processor to: identify observations that satisfy a predetermined configuration of metrics; extract feature values of a respective metric from the identified observations, wherein the respective metric is specified by the predetermined configuration of metrics; and determine parameters for feature extraction based on the feature values extracted from the identified observations and a respective label of the identified observations.

Further non-limiting aspects or embodiments are set forth in the following numbered clauses:

Clause 1: A method, comprising: identifying, with at least one processor, observations that satisfy a predetermined configuration of metrics; extracting, with the at least one processor, feature values of a respective metric from the identified observations; and determining, with the at least one processor, parameters for feature extraction based on the feature values extracted from the identified observations and a respective label of the identified observations.

Clause 2: The method of clause 1, wherein the predetermined configuration of metrics is a single non-zero valued metric in the predetermined configuration of metrics.

Clause 3: The method of clauses 1 or 2, wherein the observations are identified in labeled datasets.

Clause 4: The method of any one of clauses 1-3, wherein feature values are iteratively extracted from observations.

Clause 5: The method of any one of clauses 1-4, wherein parameters are an average or range that include feature values iteratively extracted from the observations.

Clause 6: The method of any one of clauses 1-5, wherein the observations satisfy the predetermined configuration of metrics when the observations exhibit characteristics of the metrics.

Clause 7: The method of any one of clauses 1-6, wherein metrics are based on, at least in part, a domain of the observations.

Clause 8: The method of any one of clauses 1-7, wherein the observations are driving scenarios, the predetermined configuration of metrics is a single non-zero valued metric in the predetermined configuration of metrics, the respective metric is a lateral clearance violation, and the respective label is good behavior.

Clause 9: The method of any one of clauses 1-7, wherein the observations are driving scenarios, the predetermined configuration of metrics is a single non-zero valued metric in the predetermined configuration of metrics, the respective metric is a longitudinal clearance violation, and the respective label is bad behavior.

Clause 10: The method of any one of clauses 1-7, wherein the observations are driving scenarios, the predetermined configuration of metrics is a single non-zero valued metric in the predetermined configuration of metrics, the respective metric is a deceleration violation, and further comprising determining a range of parameters for feature extraction based on the feature values extracted from the identified observations and varying labels of the identified observations.

Clause 11: A system, comprising: at least one processor, and at least one non-transitory storage media storing instructions that, when executed by the at least one processor, cause the at least one processor to: identify observations that satisfy a predetermined configuration of metrics; extract feature values of a respective metric from the identified observations, wherein the respective metric is specified by the predetermined configuration of metrics; and determine parameters for feature extraction based on the feature values extracted from the identified observations and a respective label of the identified observations.

Clause 12: The system of clause 11, wherein the predetermined configuration of metrics is a single non-zero valued metric in the predetermined configuration of metrics.

Clause 13: The system of clauses 11 or 12, wherein the observations are identified in labeled datasets.

Clause 14: The system of any one of clauses 11-13, wherein feature values are iteratively extracted from observations.

Clause 15: The system of any one of clauses 11-14, wherein parameters are an average or range that include feature values iteratively extracted from the observations.

Clause 16: The system of any one of clauses 11-15, wherein the observations satisfy the predetermined configuration of metrics when the observations exhibit characteristics of the metrics.

Clause 17: The system of any one of clauses 11-16, wherein metrics are based on, at least in part, a domain of the observations.

Clause 18: The system of any one of clauses 11-17, wherein the observations are driving scenarios, the predetermined configuration of metrics is a single non-zero valued metric in the predetermined configuration of metrics, the respective metric is a lateral clearance violation, and the respective label is good behavior.

Clause 19: The system of any one of clauses 11-17, wherein the observations are driving scenarios, the predetermined configuration of metrics is a single non-zero valued metric in the predetermined configuration of metrics, the respective metric is a longitudinal clearance violation, and the respective label is bad behavior.

Clause 20: The system of any one of clauses 11-17, wherein the observations are driving scenarios, the predetermined configuration of metrics is a single non-zero valued metric in the predetermined configuration of metrics, the respective metric is a deceleration violation, and further comprising determining a range of parameters for feature extraction based on the feature values extracted from the identified observations and varying labels of the identified observations.

Clause 21: At least one non-transitory storage media storing instructions that, when executed by at least one processor, cause the at least one processor to: identify observations that satisfy a predetermined configuration of metrics; extract feature values of a respective metric from the identified observations, wherein the respective metric is specified by the predetermined configuration of metrics; and determine parameters for feature extraction based on the feature values extracted from the identified observations and a respective label of the identified observations.

Clause 22: The at least one non-transitory storage media of clause 21, wherein the predetermined configuration of metrics is a single non-zero valued metric in the predetermined configuration of metrics.

Clause 23: The at least one non-transitory storage media of clauses 21 or 22, wherein the observations are identified in labeled datasets.

Clause 24: The at least one non-transitory storage media of any one of clauses 21-23, wherein feature values are iteratively extracted from observations.

Clause 25: The at least one non-transitory storage media of any one of clauses 21-24, wherein parameters are an average or range that include feature values iteratively extracted from the observations.

Clause 26: The at least one non-transitory storage media of any one of clauses 21-25, wherein the observations satisfy the predetermined configuration of metrics when the observations exhibit characteristics of the metrics.

Clause 27: The at least one non-transitory storage media of clauses 21-26, wherein metrics are based on, at least in part, a domain of the observations.

Clause 28: The at least one non-transitory storage media of clauses 21-27, wherein the observations are driving scenarios, the predetermined configuration of metrics is a single non-zero valued metric in the predetermined configuration of metrics, the respective metric is a lateral clearance violation, and the respective label is good behavior.

Clause 29: The at least one non-transitory storage media of clauses 21-27, wherein the observations are driving scenarios, the predetermined configuration of metrics is a single non-zero valued metric in the predetermined configuration of metrics, the respective metric is a longitudinal clearance violation, and the respective label is bad behavior.

Clause 30: The at least one non-transitory storage media of clauses 21-27, wherein the observations are driving scenarios, the predetermined configuration of metrics is a single non-zero valued metric in the predetermined configuration of metrics, the respective metric is a deceleration violation, and further comprising determining a range of parameters for feature extraction based on the feature values extracted from the identified observations and varying labels of the identified observations.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A method, comprising:
identifying, with at least one processor, driving scenarios that satisfy a predetermined configuration of metrics, wherein the predetermined configuration of metrics comprises at least one non-zero valued metric;
extracting, with the at least one processor, feature values corresponding to the at least one non-zero valued metric from the identified driving scenarios, wherein a classification of each feature value is inferred from a label of each respective driving scenario;

determining, with the at least one processor, parameters for automatic feature extraction based on the feature values extracted from the identified driving scenarios, wherein the parameters are tuned based on the classified feature values; and training, with the at least one processor, at least one machine learning model with features extracted using the automatic feature extraction according to the parameters.

2. The method of claim 1, wherein the predetermined configuration of metrics is a single non-zero valued metric in the predetermined configuration of metrics.

3. The method of claim 1, wherein the driving scenarios comprise a label that indicates good behavior by an autonomous vehicle in the scenario or bad behavior by the autonomous vehicle in the scenario.

4. The method of claim 1, wherein feature values are iteratively extracted from the driving scenarios.

5. The method of claim 1, wherein the parameters represent an average or range corresponding to the feature values.

6. The method of claim 1, wherein the driving scenarios satisfy the predetermined configuration of metrics when the driving scenarios exhibit characteristics of the metrics.

7. The method of claim 1, wherein metrics are standards used to evaluate the driving scenarios.

8. The method of claim 1, wherein the at least one non-zero valued metric is a lateral clearance violation, and the label of the respective driving scenario is good behavior.

9. The method of claim 1, wherein the at least one non-zero valued metric is a longitudinal clearance violation, and the label of the respective driving scenario is bad behavior.

10. The method of claim 1, wherein the at least one non-zero valued metric is a deceleration violation, and further comprising determining a range of parameters for feature extraction based on the feature values extracted from the identified driving scenarios and varying labels of the identified driving scenarios.

11. A system, comprising:
at least one processor, and
at least one non-transitory storage media storing instructions that, when executed by the at least one processor, cause the at least one processor to:
identify driving scenarios that satisfy a predetermined configuration of metrics, wherein the predetermined configuration of metrics comprises at least one non-zero valued metric;
extract feature values of corresponding to the at least one non-zero valued metric from the identified driving scenarios, wherein a classification of each feature value is inferred from a label of each respective driving scenario;
determine parameters for automatic feature extraction based on the feature values extracted from the identified driving scenarios, wherein the parameters are tuned based on the classified feature values; and
training at least one machine learning model with features extracted using the automatic feature extraction according to the parameters.

12. The system of claim 11, wherein the predetermined configuration of metrics is a single non-zero valued metric in the predetermined configuration of metrics.

13. The system of claim 11, wherein the driving scenarios comprise a label that indicates good behavior by an autonomous vehicle in the scenario or bad behavior by the autonomous vehicle in the scenario.

14. The system of claim 11, wherein feature values are iteratively extracted from the driving scenarios.

15. At least one non-transitory storage media storing instructions that, when executed by at least one processor, cause the at least one processor to:
identify driving scenarios that satisfy a predetermined configuration of metrics, wherein the predetermined configuration of metrics comprises at least one non-zero valued metric;
extract feature values corresponding to the at least one non-zero valued metric from the identified driving scenarios, wherein a classification of each feature value is inferred from a label of each respective driving scenario;
determine parameters for automatic feature extraction based on the feature values extracted from the identified driving scenarios, wherein the parameters are tuned based on the classified feature values; and
training at least one machine learning model with features extracted using the automatic feature extraction according to the parameters.

16. The at least one non-transitory storage media of claim 15, wherein the predetermined configuration of metrics is a single non-zero valued metric in the predetermined configuration of metrics.

17. The at least one non-transitory storage media of claim 15, wherein the driving scenarios comprise a label that indicates good behavior by an autonomous vehicle in the scenario or bad behavior by the autonomous vehicle in the scenario.

18. The at least one non-transitory storage media of claim 15, wherein feature values are iteratively extracted from the driving scenarios.

19. The at least one non-transitory storage media of claim 15, wherein the parameters represent an average or range corresponding to the feature values.

20. The at least one non-transitory storage media of claim 15, wherein the driving scenarios satisfy the predetermined configuration of metrics when the driving scenarios exhibit characteristics of the metrics.

* * * * *